United States Patent
Lin et al.

(10) Patent No.: US 10,764,117 B1
(45) Date of Patent: Sep. 1, 2020

(54) CONTROL SYSTEM AND CONTROL METHOD

(71) Applicant: ATOP Technologies Inc., Hsinchu (TW)

(72) Inventors: Yeong-Shuenn Lin, Hsinchu (TW); Chi-Ming Chuang, Hsinchu (TW); Wai-Larng Lee, HsinChu (TW)

(73) Assignee: ATOP Technologies Inc., Hsinchu (TW)

(*) Notice: Subject to any disclaimer, the term of this patent is extended or adjusted under 35 U.S.C. 154(b) by 0 days.

(21) Appl. No.: 16/558,339

(22) Filed: Sep. 3, 2019

(30) Foreign Application Priority Data

Jun. 24, 2019 (TW) .............................. 108121900 A

(51) Int. Cl.
*G06F 15/173* (2006.01)
*H04L 12/24* (2006.01)
*H04L 29/14* (2006.01)
*H04L 12/703* (2013.01)

(52) U.S. Cl.
CPC ...... *H04L 41/0654* (2013.01); *H04L 41/0695* (2013.01); *H04L 45/28* (2013.01); *H04L 69/40* (2013.01)

(58) Field of Classification Search
CPC . H04L 41/0654; H04L 41/0695; H04L 45/28; H04L 69/40
USPC ................................. 709/219, 223, 224, 229
See application file for complete search history.

(56) References Cited

U.S. PATENT DOCUMENTS

| | | | |
|---|---|---|---|
| 4,649,384 A | 3/1987 | Sheafor et al. | |
| 5,081,624 A | 1/1992 | Beukema | |
| 5,898,904 A * | 4/1999 | Wang .................. | H04W 4/12 340/7.27 |
| 6,070,251 A * | 5/2000 | Chong ................ | G06F 11/2092 714/12 |
| 7,024,257 B2 | 4/2006 | Pearce et al. | |
| 7,969,985 B1 | 6/2011 | Cline et al. | |
| 8,493,840 B2 | 7/2013 | Balasubramanian et al. | |
| 9,037,918 B2 | 5/2015 | Hoffknecht et al. | |
| 9,946,675 B2 | 4/2018 | Biskup | |
| 9,952,995 B2 | 4/2018 | Rahamim et al. | |
| 10,060,982 B2 | 8/2018 | Miles | |
| 2002/0040452 A1 * | 4/2002 | Birk ...................... | H04L 12/403 714/43 |
| 2003/0039243 A1 | 2/2003 | Parker | |
| 2006/0063541 A1 * | 3/2006 | Ryu .................. | H04M 3/42382 455/466 |

(Continued)

*Primary Examiner* — Liang Che A Wang
(74) *Attorney, Agent, or Firm* — JCIPRNET

(57) ABSTRACT

A control system and a control method are provided. The method includes: controlling, by a primary host, a plurality of clients actively; coupling a secondary host to the primary host through a synchronization link and a transmission link different from the synchronization link, where the plurality of client are coupled to each other in series on the transmission link; transmitting, by the primary host, a first instruction to the transmission link, and transmitting a first synchronization signal corresponding to the first instruction to the secondary host through the synchronization link; and determining, by the secondary host according to the first instruction and the first synchronization signal, that a failure occurs on at least one of the synchronization link and the transmission link.

9 Claims, 9 Drawing Sheets

(56) References Cited

U.S. PATENT DOCUMENTS

| | | | |
|---|---|---|---|
| 2007/0261052 A1* | 11/2007 | Bale | G06F 8/60 |
| | | | 717/174 |
| 2009/0240916 A1 | 9/2009 | Tremblay et al. | |
| 2009/0276666 A1 | 11/2009 | Haley et al. | |
| 2016/0197766 A1* | 7/2016 | Kulkarni | H04L 12/437 |
| | | | 709/224 |
| 2019/0089447 A1* | 3/2019 | Sang | H04W 36/00837 |

* cited by examiner

CONTROL SYSTEM AND CONTROL METHOD

CROSS-REFERENCE TO RELATED APPLICATION

This application claims the priority benefit of Taiwan application serial no. 108121900, filed on Jun. 24, 2019. The entirety of the above-mentioned patent application is hereby incorporated by reference herein and made a part of this specification.

BACKGROUND OF THE INVENTION

Technical Field

The present invention relates to a control system and a control method, and in particular, to a fault-tolerant control system and a fault-tolerant control method.

Description of Related Art

In recent years, there is an increasing demand for controlling a large number of motors (or drivers). In order to avoid a process shutdown caused from a communication error between a control system and a motor (for example, a communication error caused from a broken line), many kinds of control systems are designed to enable a process to keep operating normally. In general, a control capability of a system may be increased by adding a redundant link for the control system or in other manners.

SUMMARY OF THE INVENTION

An embodiment of the present invention provides a control system adapted to control a plurality of clients. The control system includes a primary host and a secondary host. The primary host actively controls the plurality of clients. The secondary host is coupled to the primary host through a synchronization link and a transmission link different from the synchronization link, where the plurality of clients are coupled in a serial manner on the transmission link. The primary host actively transmits a first instruction to the transmission link, and transmits a first synchronization signal corresponding to the first instruction to the secondary host through the synchronization link. The secondary host determines, according to the first instruction and the first synchronization signal, that a failure occurs on at least one of the synchronization link and the transmission link.

An embodiment of the present invention provides a control system adapted to control a plurality of clients. The control system includes a primary host and a secondary host. The primary host actively controls the plurality of clients. The secondary host is coupled to the primary host through a synchronization link and a transmission link different from the synchronization link, where the plurality of clients are coupled in a serial manner on the transmission link. The primary host transmits a first instruction to one of the plurality of clients through the transmission link. After the first instruction is transmitted, if the primary host does not receive a first response of the first instruction, the primary host notifies the secondary host that a failure occurs on the transmission link.

An embodiment of the present invention provides a control method for a transmission system. The transmission system includes a primary controller, a secondary controller, a conveyor belt system, a first communication link dedicated for the primary controller and the secondary controller, and a second communication link connecting the primary controller, the conveyor belt system, and the secondary controller in series. The control method includes: providing a control program to the primary controller and the secondary controller, the control program including a plurality of instructions that may be executed by the conveyor belt system and a corresponding instruction operating program; sending, by the primary controller, the plurality of instructions according to the instruction operating program through the communication link and the second communication link separately; executing, by the conveyor belt system, the plurality of instructions transmitted through the second communication link; and waiting, by the secondary controller, to receive the plurality of instructions transmitted through the first communication link and the second communication link.

An embodiment of the present invention provides an instruction processing method, including: waiting, by a secondary controller, a primary controller to send an instruction, the instruction being related to motor control; sending, by the primary controller, an instruction through a first communication link, where the instruction has not been executed on the first communication link; sending, by the primary controller, an instruction through a second communication link, where the instruction has been executed at least once on the second communication link; receiving, by the secondary controller, the instruction from the first communication link within a first waiting time; and receiving, by the secondary controller, the instruction from the second communication link within a second waiting time.

In order to make the above features of the present invention more obvious and easier to understand, the following gives descriptions by listing embodiments with reference to the accompanying drawings.

DESCRIPTION OF THE EMBODIMENTS

Figure 1A:
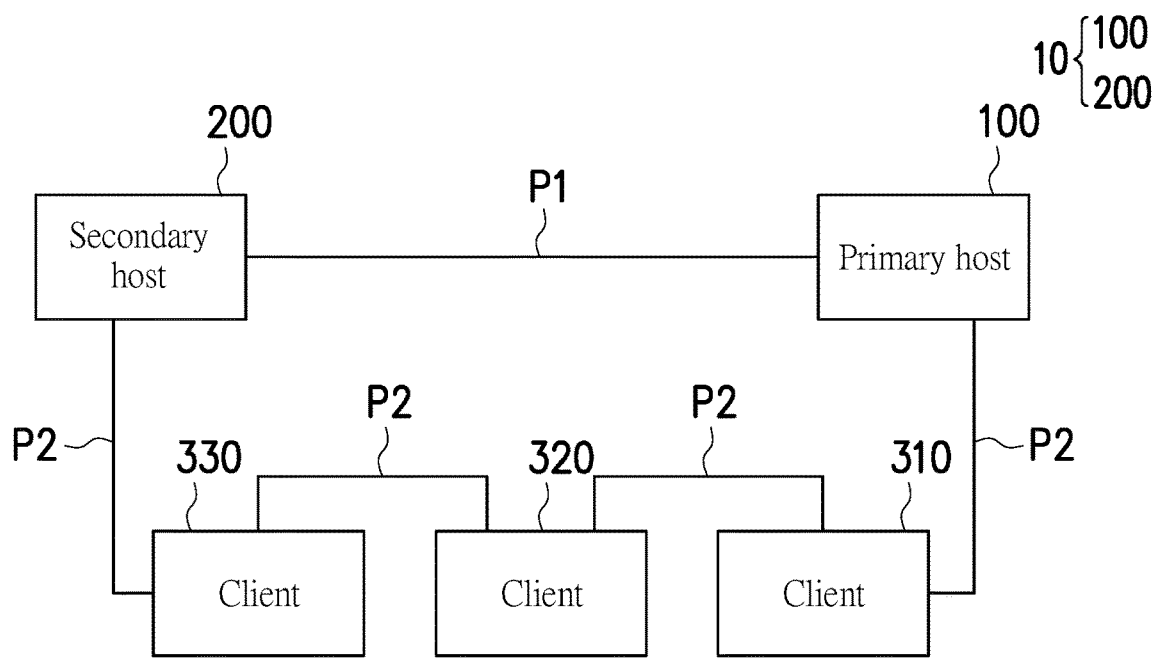
FIG. 1A is a schematic diagram showing a control system according to an embodiment of the present invention.

FIG. 1A is a schematic diagram showing a control system 10 according to an embodiment of the present invention. The control system 10 includes a primary host 100 and a secondary host 200, and is configured to control a plurality of clients 310, 320, and 330. In this embodiment, the control system 10 controls three clients. However, a number of clients may be adjusted according to a need of a user, and the present invention is not limited thereto.

The primary host 100 is configured to actively control the plurality of clients 310, 320 or 330. In particular, the primary host 100 can actively transmit, to a client, an instruction for controlling, to instruct a client to operate. The client receiving the instruction for controlling may transmit a corresponding acknowledgement (Ack) to the primary host 100 based on the received instruction. In addition, the primary host 100 may also transmit, to a client, an instruction for querying, so that the client returns a corresponding response to the primary host 100. The primary host 100 can determine an operation status of a client according to the received response. For example, it is assumed that the client 310 is a motor. The primary host 100 can enable the motor to begin to operate by transmitting an instruction to the client 310. In addition, after the client 310 receives the instruction from the primary host 100, the client 310 may transmit a corresponding response to the primary host 100 to notify the primary host 100 of a status of the client 310. The status includes, for example, a parameter such as a rotational speed of the motor or a temperature of the motor, but the present invention is not limited thereto.

The secondary host 200 is a redundant host of the control system 10. When the control system 10 operates normally, the secondary host 200 does not need to actively send, to the client 310, 320, or 330, an instruction for controlling or querying. The secondary host 200 is coupled to the primary host 100 through a synchronization link P1 and a transmission link P2 different from the synchronization link P1, where the clients 310, 320, and 330 are coupled in a serial manner on the transmission link P2. In other words, when at least one of the clients 310, 320, and 330 fails, or a broken line occurs in the transmission link P2, the primary host 100 cannot transmit an instruction to the secondary host 200 through the transmission link P2.

Figure 1B:
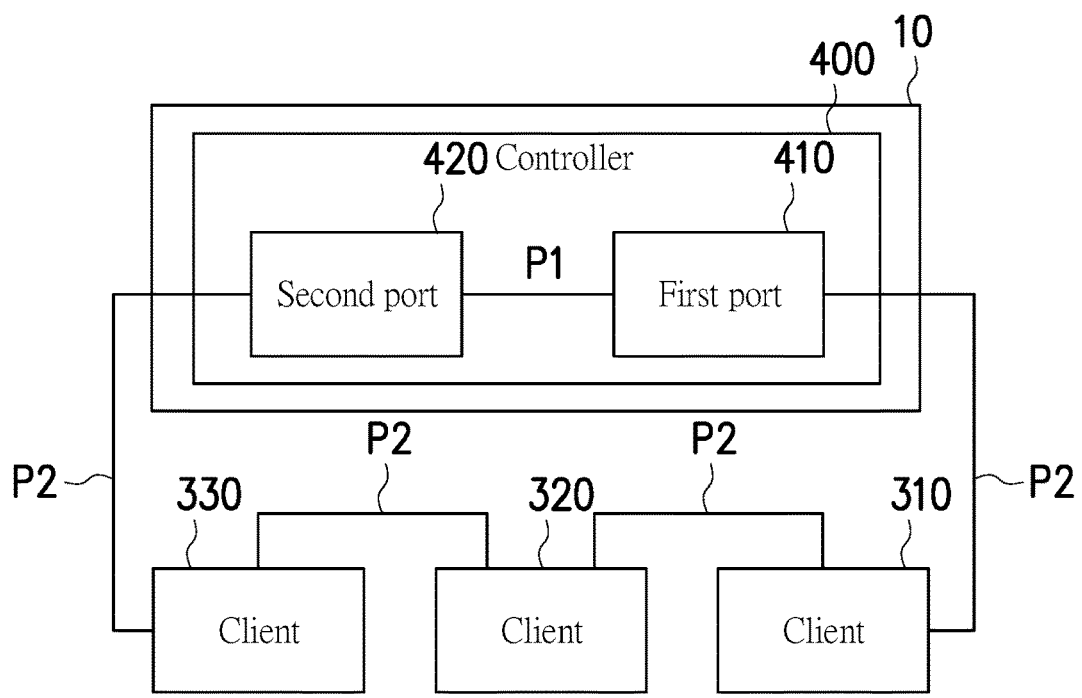
FIG. 1B is a schematic diagram showing another aspect of a control system according to an embodiment of the present invention.

In an embodiment, the primary host 100 and the secondary host 200 may be implemented by a same controller. For example, the primary host 100 and the secondary host 200 may be, for example, virtual hosts, and correspond to different ports of a same controller respectively. FIG. 1B is a schematic diagram showing another aspect of a control system 10 according to an embodiment of the present invention. The control system 10 includes a controller 400. The controller 400 has a first port 410 and a second port 420. The second port 420 is coupled to the first port 410 through a synchronization link P1 and a transmission link P2 different from the synchronization link P1, and clients 310, 320, and 330 are coupled in a serial manner on the transmission link P2. The first port 410 can serve as the primary host 100 is shown in FIG. 1A to perform a function similar that performed by the primary host 100, and the second port 420 can serve as the secondary host 200 shown in FIG. 1A to perform a function similar to that performed by the secondary host 200. For convenience of description, a function of the control system 10 is illustrated below by using an aspect shown in FIG. 1A as an example.

Figure 2A:
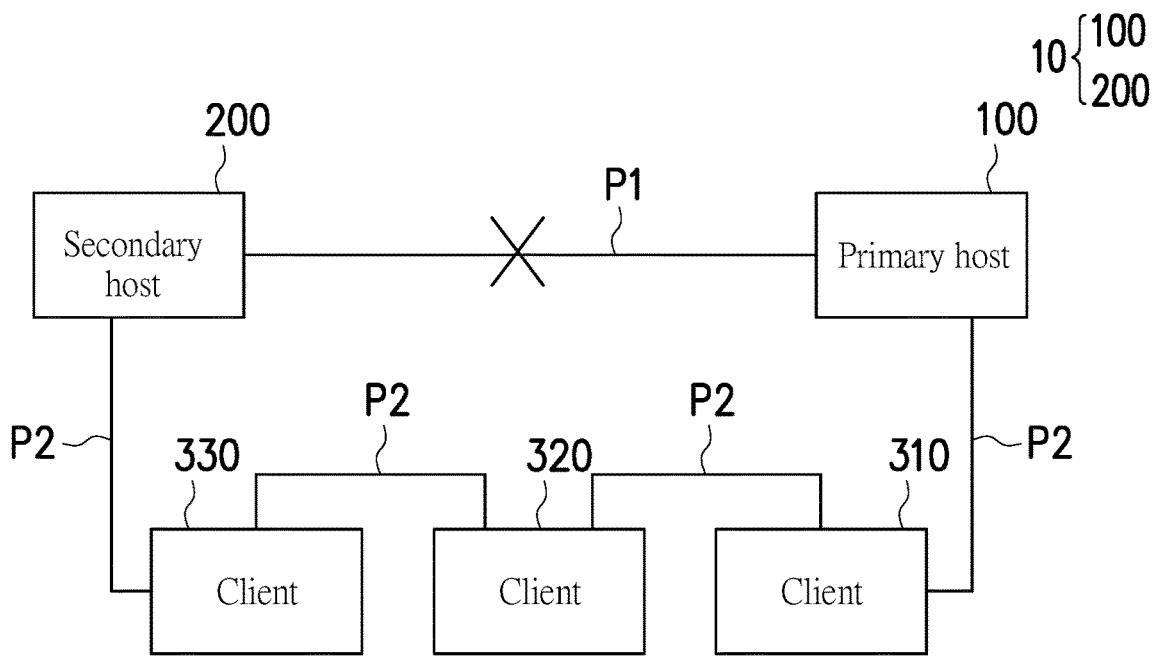
FIG. 2A is a schematic diagram showing failing of a synchronization link of a control system according to an embodiment of the present invention.

FIG. 2A is a schematic diagram showing failing of a synchronization link P1 of a control system 10 according to an embodiment of the present invention. The synchronization link P1 is dedicated for communication between the primary host 100 and the secondary host 200. Failing of the synchronization link P1 represents that a broken line occurs on the synchronization link P1 or that a node (for example, the primary host 100 and the secondary host 200) on the synchronization link P1 fails.

Figure 2B:
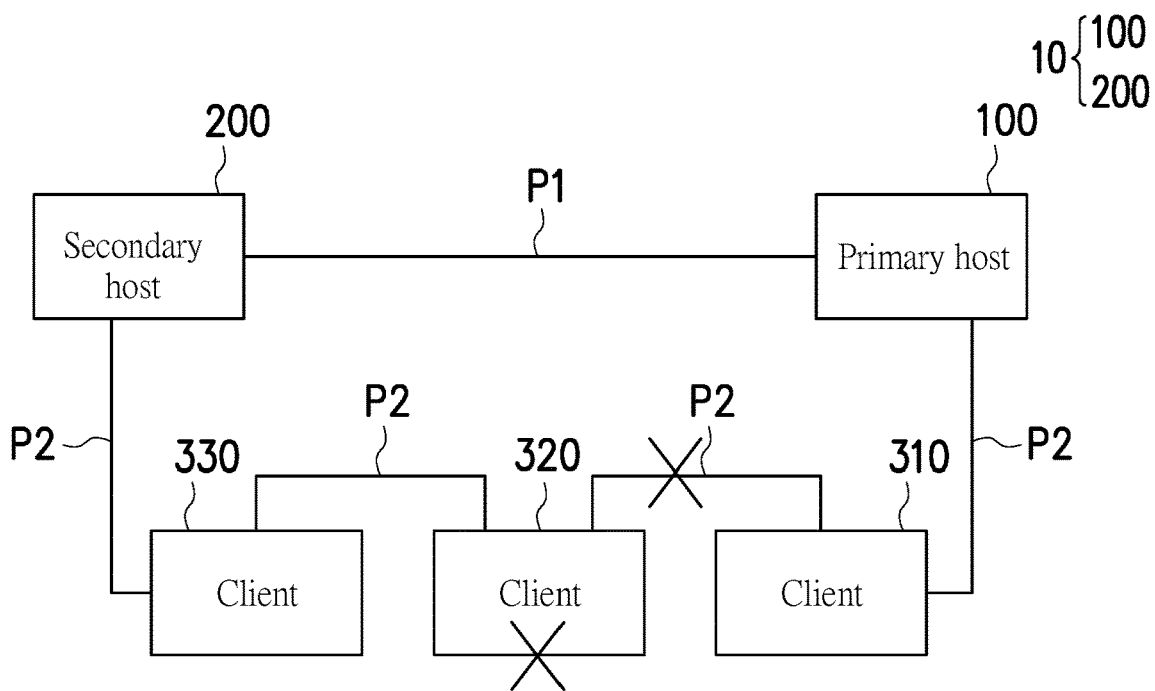
FIG. 2B is a schematic diagram showing failing of a transmission link of a control system according to an embodiment of the present invention.

FIG. 2B is a schematic diagram showing failing of a transmission link P2 of a control system 10 according to an embodiment of the present invention. The transmission link P2 is configured to transmit an instruction or data. For example, the primary host 100 or the secondary host 200 may transmit an instruction to the client 310, the client 320, and the client 330 through the transmission link P2 in a unicast, multicast, or broadcast manner. In order to control a plurality of clients (for example, a motor control card), an instruction may be transmitted by the primary host 100 in a multicast or broadcast manner. Some instructions do not necessarily require a client response, such as an instruction for controlling a direction or a speed of a motor. In addition, some instructions require a client response, such as an instruction for querying a temperature or a vibration status of a motor. If necessary, the secondary host 200 may assist or replace the primary host 100 to send an instruction. Failing of the transmission link P2 represents that a broken occurs on the transmission link P2 or that a node (that is, the primary host 100, the secondary host 200, the client 310, the client 320, or the client 330) on the transmission link P2 fails. As shown in FIG. 2B, if the client 320 fails or a broken line occurs on the transmission link P2 between the client 310 and the client 320, an instruction or data transmitted by the primary host 100 to the secondary host 200 through transmission link P2 cannot be transmitted to the client 320 or the client 330 but only the client 310.

The primary host 100 can send an instruction through transmission link P2 and receive sensing data such as a motor speed or a motor temperature from client the 310, the 320 or the 330 when necessary. When the client on the transmission link P2 fails or a broken line occurs on the transmission link P2, the primary host 100 cannot communicate with the client 310, 320, or 330. For example, if a broken line occurs between the client 310 and the client 320, the primary host 100 cannot obtain sensing data of the client 320 by communicating with the client 320 through the transmission link P2. For another example, if the client 320 fails, the primary host 100 cannot obtain sensing data of the client 320 by communicating with the client 320 through the transmission link P2. In this case, the secondary host 200 is required to assist in sending an instruction or even receiving corresponding data.

Figure 3:
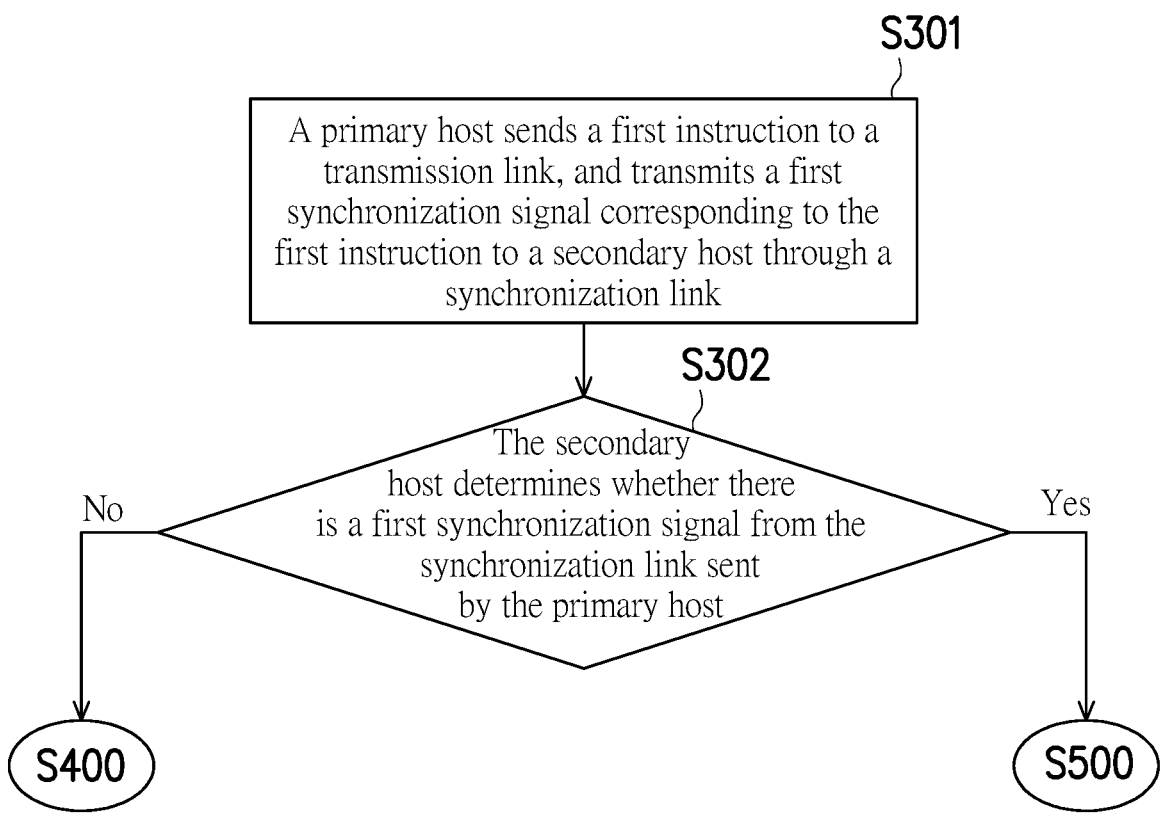
FIG. 3 is a flowchart showing a control method according to an embodiment of the present invention.

FIG. 3 is a flowchart showing a control method according to an embodiment of the present invention. The control method can be used to determine whether the synchronization link P1, the transmission link P2, or the node (for example, the primary host 100, the secondary host 200, the client 310, the client 320 or the client 330) on the synchronization link P1 and the transmission link P2 fails, and the control method may be implemented by the control system 10 shown in FIG. 1A (or FIG. 1B). Referring to FIG. 1A and FIG. 3, in step S301, the primary host 100 sends a first instruction (for example, a start-up instruction, an acceleration instruction, or a speed fixing instruction for controlling a motor) to the transmission link P2, and transmits a first synchronization signal corresponding to the first instruction to the secondary host 200 through the synchronization link P1. The first synchronization signal is used to notify the secondary host 200 that the first instruction is to be executed. When the transmission link P2 does not fail, the first instruction sent by the primary host 100 can be received by the secondary host 200 ultimately. For example, assuming that a target of the first instruction is the client 320 (that is, the first instruction is used to control operation of the client 320), after the client 320 receives the first instruction, the first instruction is transmitted to the secondary host 200 subsequently.

In step S302, the secondary host 200 determines whether there is a first synchronization signal from the synchronization link P1 sent by the primary host 100. If the secondary host 200 does not receive the first synchronization signal within a predetermined time, it proceeds to a process S400. If the secondary host 200 does not receive the synchronization signal, it represents that at least one of the synchronization link P1 or the primary host 100 may fail. In addition, if the secondary host 200 receives the first synchronization signal within the predetermined time, it proceeds to a process S500. If the secondary host 200 receives the first synchronization signal, it represents that the primary host 100 does not fail, and no broken line occurs on the synchronization link P1.

Figure 4:
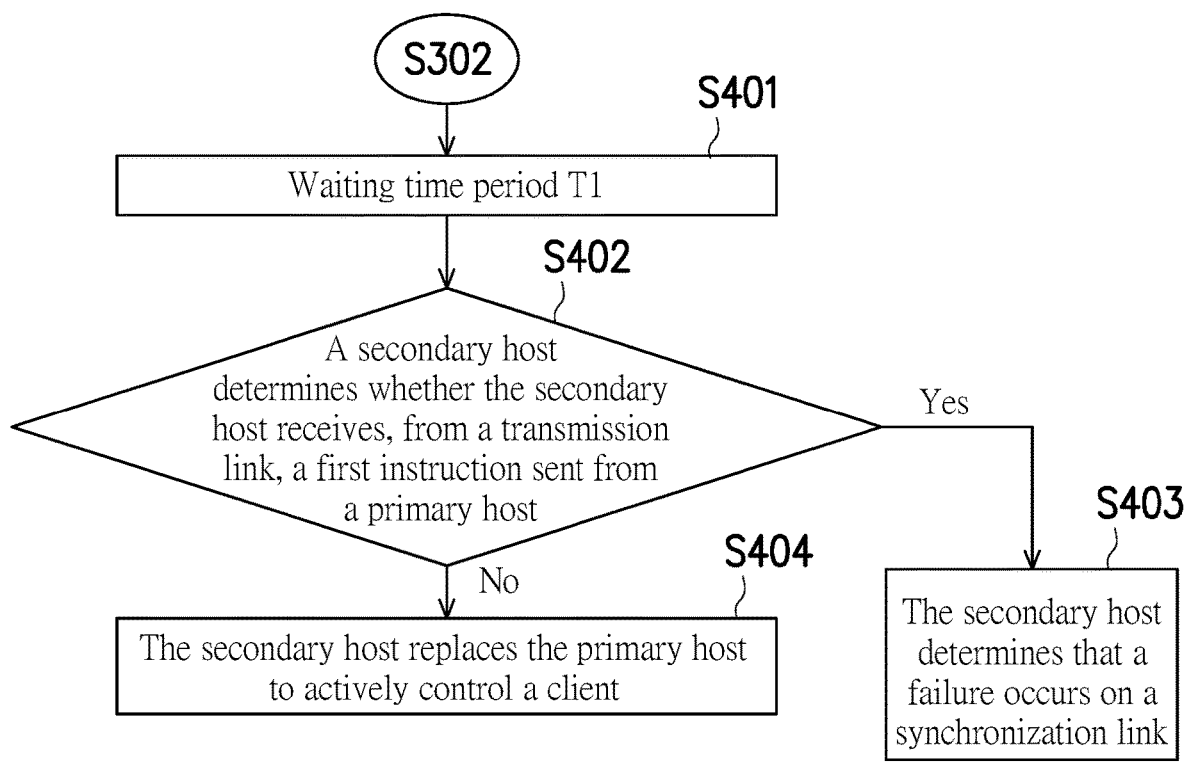
FIG. 4 is a flowchart further showing a step of FIG. 3 according to an embodiment of the present invention.

FIG. 4 is a flowchart further showing step S400 of FIG. 3 according to an embodiment of the present invention. In the embodiment shown in FIG. 4, if the secondary host 200 receives the first instruction but does not receive the first synchronization signal, then the secondary host 200 determines that a failure occurs on the synchronization link P1. In addition, if the secondary host 200 does not receive the first synchronization signal or the first instruction, the secondary host 200 serves as the primary host to actively control the clients 310, 320, and 330.

Referring to FIG. 1A and FIG. 4, if the secondary host 200 determines that the secondary host 200 does not receive the first synchronization signal from the primary host 100 through the synchronization link P1, it represents that in step S401, the secondary host 200 has waited for a time period T1. A length of the time period T1 may be adjusted according to a need of a user, and the present invention is not limited thereto.

In step S402, the secondary host 200 determines whether the secondary host 200 receives, through the transmission link P2, the first instruction sent by the primary host 100. If the secondary host 200 receives the first instruction from the transmission link P2, it proceeds to step S403. In addition, if the secondary host 200 does not receive the first instruction from the transmission link P2, then it proceeds to a process step S404.

In step S402, if the secondary host 200 receives the first instruction from the transmission link P2, it represents that no broken line occurs on the transmission link P2, and the clients 310, 320, and 330 operate normally. The secondary host 200 can accordingly determine that the primary host 100 does not fail. Therefore, the secondary host 200 can determine a reason why the secondary host 200 does not receive the first synchronization signal from the primary host 100 in step 302. It is not because the primary host 100 does not transmit the first synchronization signal, but because a broken line occurs on the synchronization link P1. Accordingly, in step S403, the secondary host 200 determines that a failure occurs on the synchronization link P1, and issues a relevant warning. For example, the secondary host 200 may be coupled to a display or a speaker, and issue, using the display or the speaker, a warning that a failure occurs on the synchronization link P1.

In addition, in step S402, if the secondary host 200 does not receive the first instruction from the transmission link P2, it represents that the secondary host 200 neither receives the first synchronization signal from the primary host 100 in step S302, nor receives the first instruction. In step S404, if the secondary host 200 does not receive the first synchronization signal or the first instruction, the secondary host 200 determines that the primary host 100 may fail. Then, the secondary host 200 replaces the primary host 100 to serve as the primary host, so as to actively control the clients 310, 320, and 330. Therefore, control of the clients 310, 320, and 330 are not interrupted by a failure of the primary host 100.

In an embodiment, after the secondary host 200 serves as the primary host, the secondary host 200 does not communicate with the failed primary host 100 through the synchronization link P1.

Figure 5:
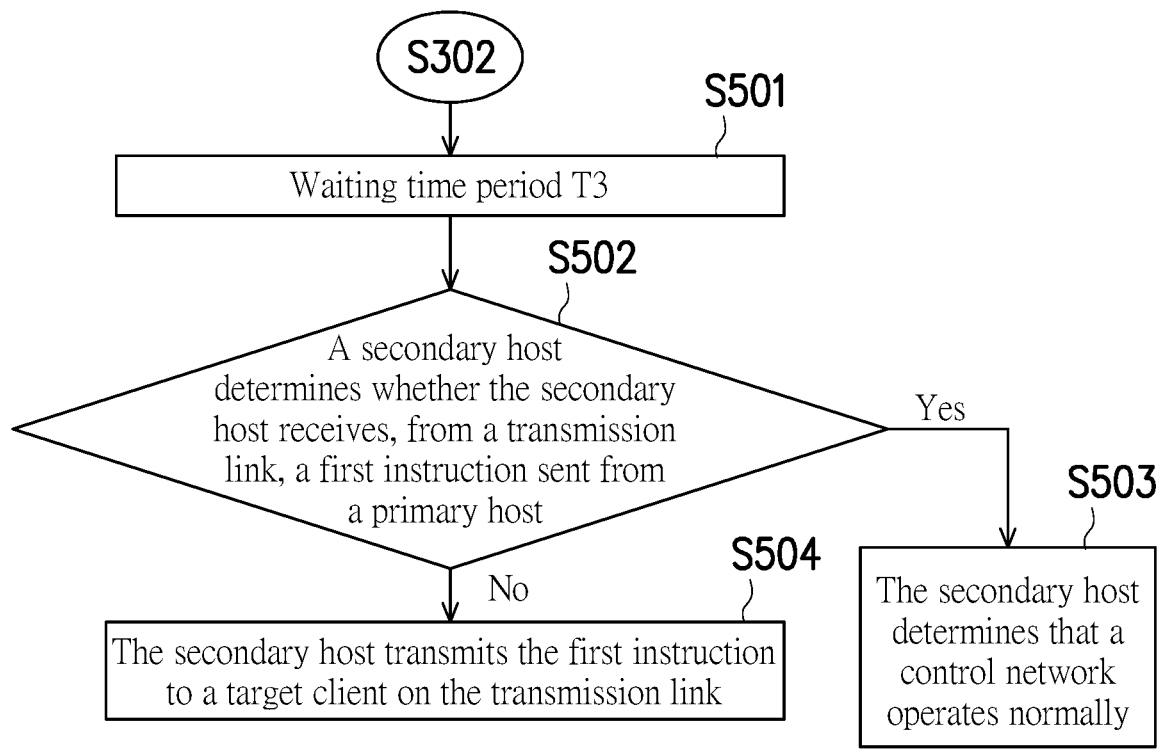
FIG. 5 is a flowchart further showing another step of FIG. 3 according to an embodiment of the present invention.

FIG. 5 is a flowchart further showing step S500 of FIG. 3 according to an embodiment of the present invention. In an embodiment shown in FIG. 5, if the secondary host 200 receives the first synchronization signal but does not receive the first instruction, the secondary host 200 determines that a failure instruction occurs on the transmission link P2, and transmits a first instruction to at least one of the clients 310, 320, and 330 through the transmission link P2 to assist the primary host 100 in controlling operation of the clients.

In particular, referring to FIG. 1A and FIG. 5, after the secondary host 200 determines that the secondary host 200 receives the first synchronization signal from the primary host 100 through the synchronization link P1 within the predetermined time, in step S501, the secondary host 200 waits for a time period T3. A length of the time period T3 may be adjusted according to a need of a user, and the present invention is not limited thereto. In an embodiment, the secondary host 200 can notify, through the synchronization link P1, the primary host 100 of a status of receiving the first synchronization signal by the secondary host 200.

In step S502, the secondary host 200 determines whether the secondary host 200 receives, through the transmission link P2, the first instruction sent by the primary host 100. If the secondary host 200 receives the first instruction from the transmission link P2, it proceeds to step S503. If the secondary host 200 does not receive the first instruction from the transmission link P2, it proceeds to step S504. In some embodiments, the secondary host 200 can notify, through the synchronization link P1, the primary host 100 of a status of receiving the first instruction by the secondary host 200.

In step S502, if the secondary host 200 receives the first instruction from the transmission link P2, it represents that no broken line occurs on the transmission link P2, and the clients 310, 320, and 330 operate normally. Therefore, in step S503, the secondary host 200 determines that neither the synchronization link P1 and the transmission link P2 fail, nor the node (for example, the primary host 100 or the client 310 to the client 330) on the synchronization link P1 and the transmission link P2 fails. In other words, in step S503, the secondary host 200 determines whether a control network managed by the control system 10 operates normally.

In addition, in step S502, if the secondary host 200 does not receive the first instruction from the transmission link P2, then it proceeds to step S504. In step S504, the secondary host 200 transmits a first instruction to a target client (for example, at least one of the clients 310, 320, and 330) on the transmission link P2.

Figure 6:
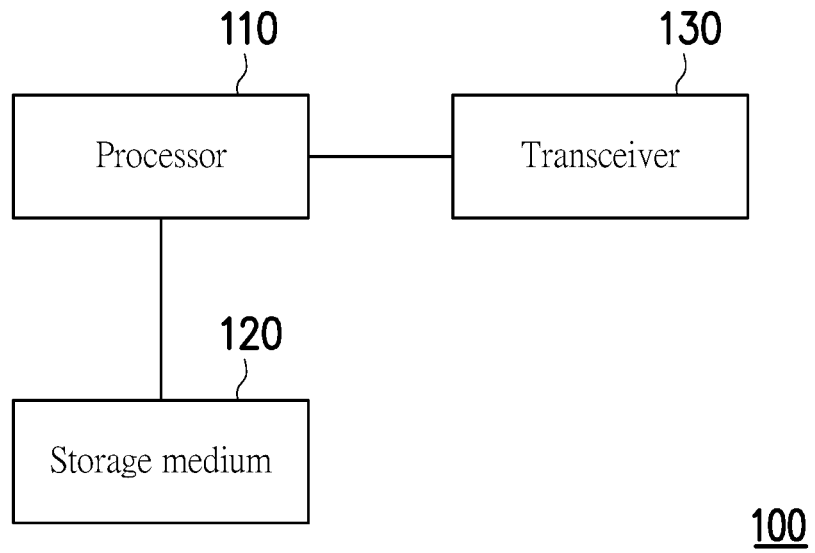
FIG. 6 is a schematic diagram showing a primary host according to an embodiment of the present invention.

FIG. 6 is a schematic diagram showing a primary host 100 according to an embodiment of the present invention. The primary host 100 is at least configured to perform the methods shown in FIG. 3 to FIG. 5 and FIG. 8 to FIG. 9. The primary host 100 includes but is not limited to a processor 110, a storage medium 120, and a transceiver 130.

The processor 110 is, for example, a central processing unit (CPU), or other programmable microprocessors for general purposes or special purposes, a digital signal processor (DSP), a programmable controller, an application specific integrated circuit (ASIC), a graphics processing unit (GPU), or other similar components or a combination of the foregoing components.

The storage medium 120 is coupled to the processor 110, and is, for example, any type of fixed or removable random access memory (RAM), read-only memory (ROM), flash memory, hard disk drive (HDD), solid state drive (SSD) or similar components or a combination of the foregoing components. The storage medium 120 stores a plurality of modules or programs for the processor 110 to access, so that processor 110 can perform various functions of the primary host 100.

The transceiver 130 is coupled to the processor 110. The transceiver 130 can transmit or receive a signal for communication. Communication protocols supported by the transceiver 130 may include Wi-Fi, Bluetooth, ZigBee, Ethernet, a media redundancy protocol (MRP), serial communication, an Internet protocol (TCP/IP protocol), or a user datagram protocol (UDP), but the present invention is not limited thereto.

Figure 7:
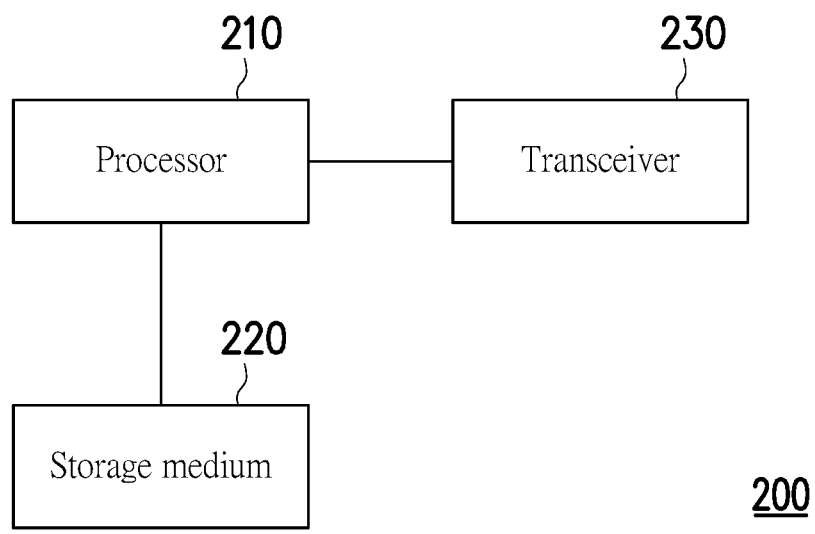
FIG. 7 is a schematic diagram showing a secondary host according to an embodiment of the present invention.

FIG. 7 is a schematic diagram showing a secondary host 200 according to an embodiment of the present invention. A configuration of the secondary host 200 is consistent with that of the primary host 100.

Figure 8:
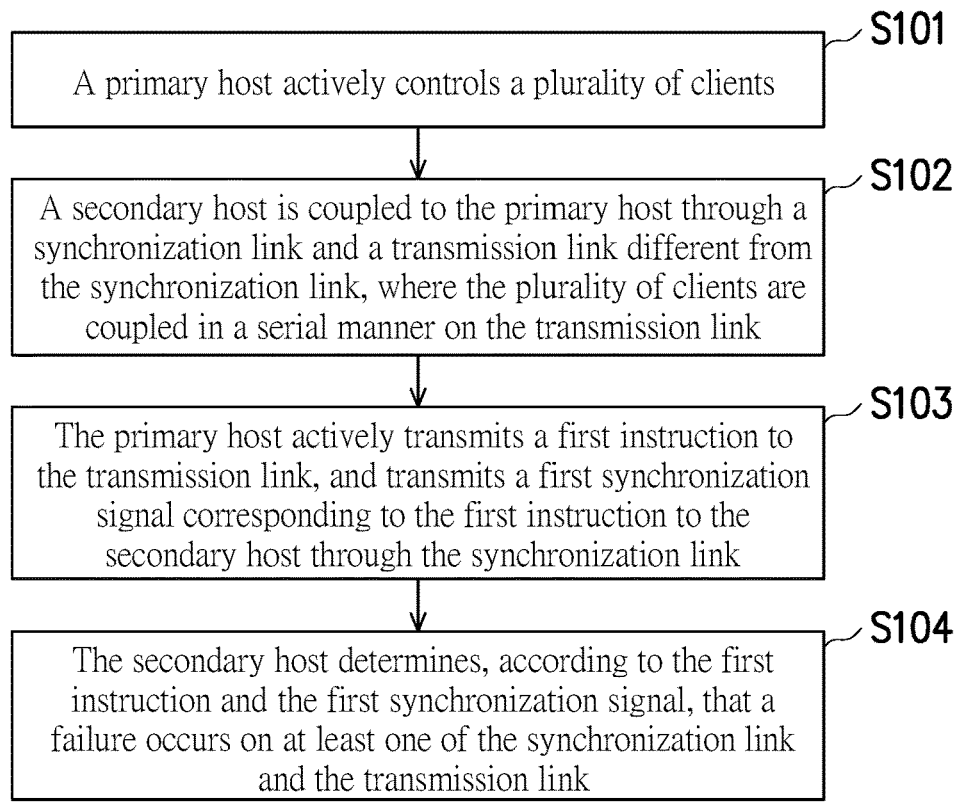
FIG. 8 is a flowchart showing a control method according to an embodiment of the present invention.

FIG. 8 is a flowchart of a control method according to an embodiment of the present invention. In step S101, a primary host actively controls a plurality of clients. In step S102, a secondary host is coupled to the primary host through a synchronization link and a transmission link different from the synchronization link, where the plurality of clients are coupled in a serial manner on the transmission link. In step S103, the primary host actively transmits a first instruction to the transmission link, and transmits the first synchronization signal corresponding to the first instruction to the secondary host through the synchronization link. In step S104, the secondary host determines, according to the first instruction and the first synchronization signal, that a failure occurs on at least one of the synchronization link and the transmission link.

Figure 9:
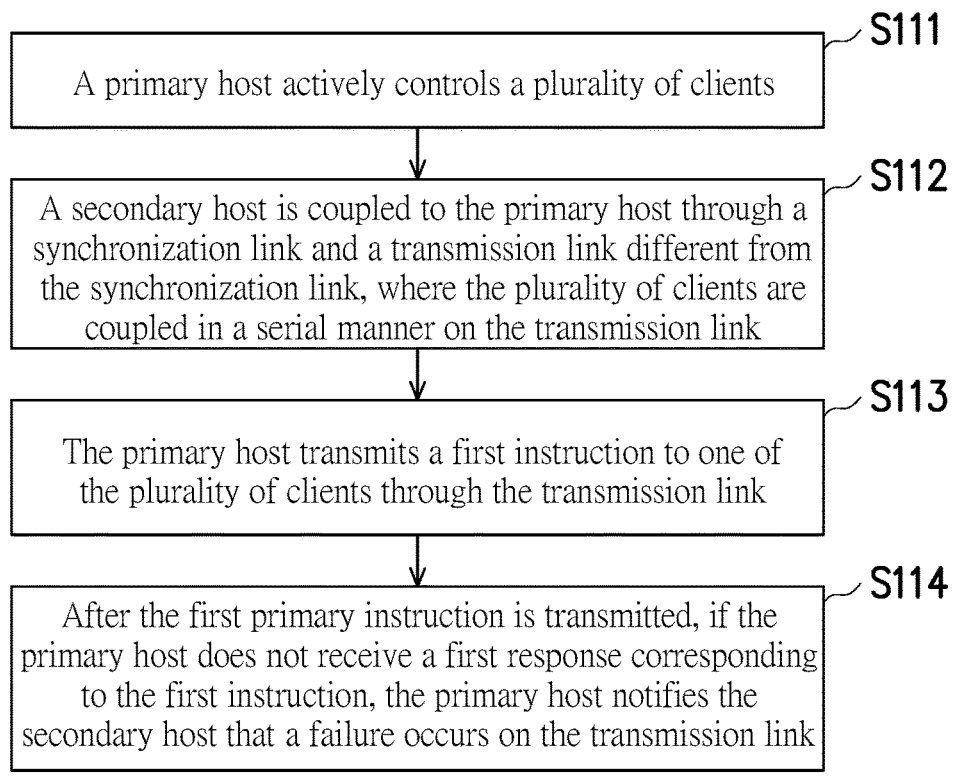
FIG. 9 is a flowchart showing another control method according to an embodiment of the present invention.

FIG. 9 is a flowchart of another control method according to an embodiment of the present invention. In step S111, a primary host actively controls a plurality of clients. In step S112, a secondary host is coupled to the primary host through a synchronization link and a transmission link different from the synchronization link, where the plurality of clients are coupled in a serial manner on the transmission link. In step S113, the primary host transmits a first instruction to one of the plurality of clients through the transmission link. In step S114, after the first instruction is transmitted, if the primary host does not receive a first response corresponding to the first instruction, the primary host notifies the secondary host that a failure occurs on the transmission link, and the secondary host assists in controlling the plurality of clients as described in the previous embodiments.

Figure 10:
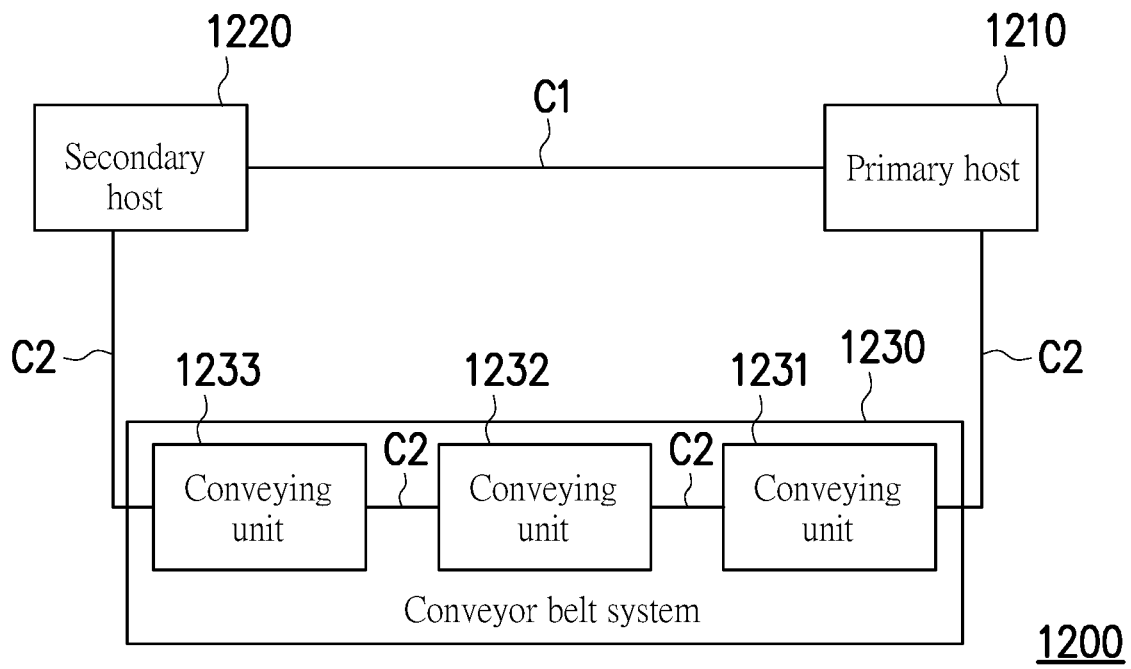
FIG. 10 is a schematic diagram showing a transmission system according to an embodiment of the present invention.

FIG. 10 is a schematic diagram showing a transmission system 1200 according to an embodiment of the present invention. The transmission system 1200 includes a primary controller 1210, a secondary controller 1220, a conveyor belt system 1230, a message link C1 dedicated for the primary controller 1210 and the secondary controller 1220, and a system link C2 connecting the primary controller 1210, the conveyor belt system 1230 and the secondary controller 1220 in series. The primary controller 1210 may have a similar software/hardware configuration as the primary host 100 shown in FIG. 6, and the secondary controller 1220 may have a similar software/hardware configuration as the secondary host 200 shown in FIG. 7, and therefore details are not described again. The conveyor belt system 1230 may include a conveying unit 1231, a conveying unit 1232, and a conveying unit 1233. The conveying unit 1231, the conveying unit 1232, or the conveying unit 1233 may include a motor, a roller, a conveyor belt, a sensor (for example, a temperature sensor or a position sensor), or a detection device (for example, an image identifying system to identify a defective product or a machine arm to pick out a defective product), but the present invention is not limited thereto.

In an embodiment, it is assumed that the transmission system 1200 operates normally. The primary controller 1210 executes a primary control program. The primary control program consists of a series of sequential instructions. In an embodiment, the primary control program further includes a corresponding instruction operating program. The secondary controller 1220 executes a secondary control program. The secondary control program and the primary control program have a same instruction and a same instruction sequence. There is a conveyor belt system 1230 between the primary controller 1210 and the secondary controller 1220, and the primary controller 1210, the secondary controller 1220, and the conveyor belt system 1230 are connected in series by a system link C2 that is configured to transmit an instruction and data. The primary controller 1210 sequentially sends, to a motor of the conveying unit 1231, a motor of the conveying unit 1232, and a motor of the conveying unit 1233, three motor instructions in the primary control program: a start-up instruction, an acceleration instruction (for example, an acceleration instruction used to instruct a motor to accelerate a predefined angular speed by 3 seconds), and a speed fixing instruction.

In particular, the primary controller 1210 sends a start-up instruction to the secondary controller 1220 through the message link C1 (if the secondary controller 1220 receives the start-up instruction from the secondary control program, the secondary controller 1220 can synchronize with the primary control program). In addition, the primary controller 1210 sends start-up instructions to the motor of the conveying unit 1231, the motor of the conveying unit 1232, and the motor of the conveying unit 1233 through the system link C2. Subsequently, the secondary control program begins to wait for the start-up instructions forwarded from the motor of the conveying unit 1231, the motor of the conveying unit 1232, and the motor of the conveying unit 1233. The motor of the conveying unit 1231 is used as an example. A default value of the start-up instruction is used to enable a rotate speed of the motor of the conveying unit 1231 to reach 120 rpm. After the rotate speed of the motor of the conveying unit 1231 is stably maintained for 10 seconds, the motor of the conveying unit 1231 returns to the primary controller 1210 a fact that the start-up instruction is successfully executed.

The primary controller 1210 transmits the start-up instruction through the system link C2. After the start-up instruction passes through the motor of the conveying unit 1231, the motor of the conveying unit 1232, and the motor of the conveying unit 1233, the start-up instruction arrives at the secondary controller 1220 within a predetermined instruction transmission time. Next, the secondary controller 1220 returns to the primary controller 1210 a fact that the start-up instruction is successfully transmitted. Then, the primary controller 1210 processes the acceleration instruction and the speed fixing instruction in sequence.

Figure 11A:
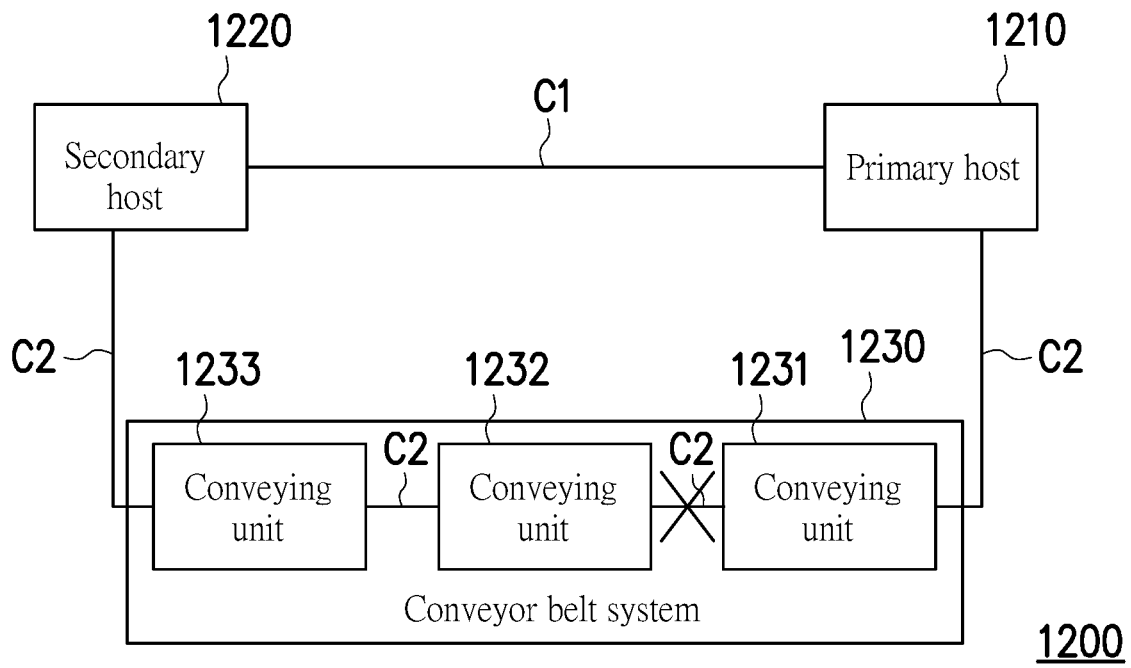
FIG. 11A is a schematic diagram showing failing of a system link of a transmission system according to an embodiment of the present invention.

In an embodiment, it is assumed that a broken line occurs between the conveying unit 1231 and the conveying unit 1232, which is shown in FIG. 11A. FIG. 11A is a schematic diagram showing failing of a system link C2 of a transmission system 1200 according to an embodiment of the present invention. After the secondary controller 1220 receives a start-up instruction through the message link C1, if the secondary controller 1220 does not receive another start-up instruction through the system link C2 within a predetermined instruction transmission time, the secondary controller 1220 conversely sends the start-up instruction (relative to a predetermined transmission direction of the another start-up instruction). Then, after the secondary controller 1220 receives returned results (which are returned to a source of the start-up instruction) forwarded by the motor of the conveying unit 1232 and the motor of the conveying unit 1233, the secondary controller 1220 transmits the returned results to the primary controller 1210. Then, the primary controller 1210 processes the acceleration instruction and the speed fixing instruction in sequence.

Figure 11B:
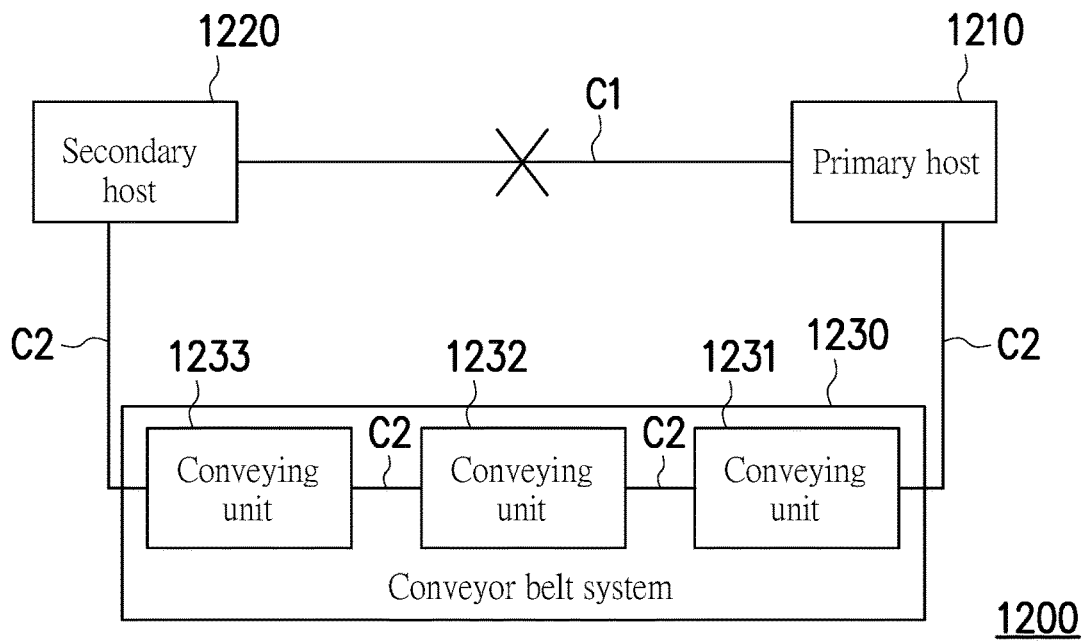
FIG. 11B is a schematic diagram showing failing of occurring on a message link of a transmission system according to an embodiment of the present invention.

In an embodiment, it is assumed that a broken line occurs between the primary controller 1210 and the secondary controller 1220, which is shown in FIG. 11B. FIG. 11B is a schematic diagram showing failing of a message link C1 of a transmission system 1200 according to an embodiment of the present invention. The secondary controller 1220 schedules, according to instructions in the secondary control program, an order for executing these instructions. Then, the secondary controller 1220 waits for a scheduled instruction (for example, a start-up instruction for the motor) transmitted by the primary controller 1210 through the message link C1 and the system link C2. After the secondary controller 1220 returns to the primary controller 1210 a fact that the start-up instruction is successfully transmitted, the secondary controller 1220 waits for the primary controller 1210 to transmit an acceleration instruction scheduled after the start-up instruction.

If the secondary controller 1220 does not receive, within a predetermined message transmission time for a controller, an acceleration instruction sent by the primary controller 1210 through the message link C1, the secondary controller 1220 begins to wait for the acceleration instruction transmitted by the primary controller 1210 through the system link C2. Then, after the secondary controller 1220 receives the acceleration instruction from the system link C2 within the predetermined instruction transmission time, the secondary controller 1220 begins to wait for a speed fixing instruction that is scheduled after the acceleration instruction and that is transmitted through the message link C1.

In an embodiment, it is assumed that the primary controller 1210 fails. After the secondary controller 1220 returns, to the primary controller 1210 through the message link C1, a message that the start-up instruction is successfully transmitted, if the primary controller 1210 neither receives, within a predetermined message transmission time for a controller, the acceleration instruction transmitted by the primary controller 1210 through the message link C1, nor receives, within a predetermined instruction transmission time, the acceleration instruction transmitted by the primary controller 1210 through the system link C2, the secondary controller 1220 sends an acceleration instruction to the system link C2. After the secondary controller 1220 sends the acceleration instruction, the motor of the conveying unit 1233 receives the acceleration instruction earlier than the motor of the conveying unit 1232 and the motor of the conveying unit 1231. The secondary controller 1220 no longer waits for any instruction from the message link C1, and actively sends a subsequently scheduled instruction to the motor of the conveying unit 1233, the motor of the conveying unit 1232, or the motor of the conveying unit 1231 according to the secondary control program. In other words, the secondary controller 1220 takes over a task of the primary controller 1210.

Figure 12:
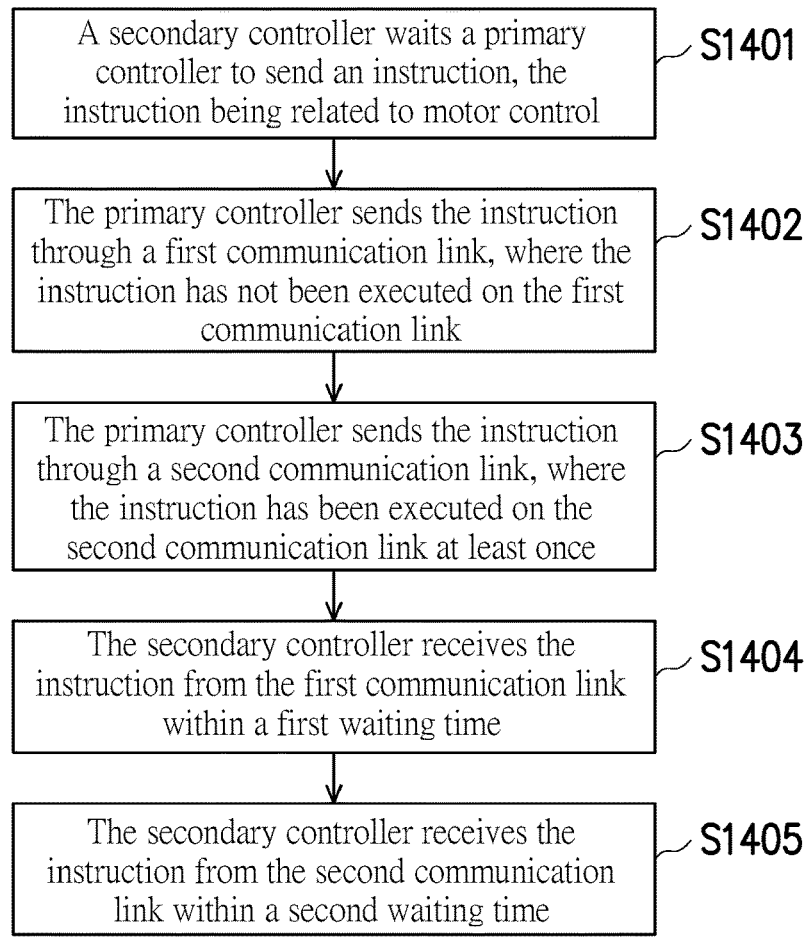
FIG. 12 is a flowchart showing an instruction processing method according to an embodiment of the present invention

FIG. 12 is a flowchart showing an instruction processing method according to an embodiment of the present invention. The instruction processing method may be implemented by the transmission system 1200 shown in FIG. 10. In step S1401, a secondary controller waits for a primary controller to send an instruction, the instruction being related to motor control. More particularly, the instruction is related to a condition affecting motor control, such as start-up, acceleration, and stop of a motor, or detection of a speed or a temperature a motor, and other environmental conditions that may affect start-up or stop of a motor.

In step S1402, the primary controller sends an instruction through a first communication link (for example, a message link C1), where the instruction has not been executed on the first communication link.

In step S1403, the primary controller sends an instruction through a second communication link (for example, a system link C2), where the instruction has been executed on the second communication link at least once.

In step S1404, the secondary controller receives the instruction from the first communication link within a first waiting time. In addition, if the secondary controller neither receives the instruction from the first communication link within the first waiting time, nor receives the instruction from the second communication link within a second waiting time, the secondary controller stops waiting for other instructions sent the primary controller.

In step S1405, the secondary controller receives the instruction through the second communication link within a second waiting time. In addition, if the secondary controller does not receive the instruction from the second communication link within the second waiting time, the secondary controller sends the instruction through the second communication link.

In summary, the control method of the present invention may be applied to a variety of communication protocols, including serial link or Ethernet. The secondary host of the present invention can replace the primary host to control clients when the primary host cannot successfully control these clients, so that each client can operate uninterruptedly.

Although the present invention has been disclosed in the foregoing embodiments, the embodiments are not intended to limit the present invention. Anyone having ordinary knowledge in the technical field may make some changes and refinements without departing from a spirit and scope of the present invention. Therefore, protection scope of the present invention is subject to terms defined in the appended claims.

What is claimed is:

1. A control system adapted to control a plurality of motors, the control system comprising:
a primary host for actively controlling the plurality of motors; and
a secondary host coupled to the primary host through a synchronization link and a transmission link different from the synchronization link, wherein
the plurality of motors are coupled in a serial manner on the transmission link;
the primary host actively transmits a first instruction to the transmission link, and transmits a first synchronization signal corresponding to the first instruction to the secondary host through the synchronization link; and
the secondary host determines, according to the first instruction and the first synchronization signal, that a failure occurs on at least one of the synchronization link and the transmission link, wherein if the secondary host does not receive the first synchronization signal and the first instruction, the secondary host begins to actively control the plurality of motors.

2. The control system according to claim 1, wherein if the secondary host receives the first synchronization signal but does not receive the first instruction, the secondary host determines that a failure occurs on the transmission link.

3. The control system according to claim 2, wherein if the secondary host receives the first synchronization signal but does not receive the first instruction, the secondary host transmits the first instruction to at least one of the plurality of clients through the transmission link.

4. The control system according to claim 3, wherein if the secondary host does not receive the first instruction after a waiting time, the secondary host transmits the first instruction through the transmission link.

5. The control system according to claim 1, wherein if the secondary host receives the first instruction but does not receive the first synchronization signal, the secondary host determines that a failure occurs on the synchronization link.

6. The control system according to claim 1, wherein the primary host and the secondary host each is a virtual host, and the primary host and the secondary host correspond to different ports of one controller respectively.

7. A control system adapted to control a plurality of motors, the control system comprising:
a primary host for actively controlling the plurality of motors; and
a secondary host coupled to the primary host through a synchronization link and a transmission link different from the synchronization link, wherein
the plurality of motors are coupled in a serial manner on the transmission link;
the primary host transmits a first instruction to one of the plurality of motors through the transmission link and transmits a first synchronization signal corresponding to the first instruction through the synchronization link; and
after the first instruction is transmitted, if the primary host does not receive a first response of the first instruction, the primary host notifies the secondary host that a failure occurs on the transmission link, wherein if the secondary host does not receive the first synchronization signal and the first instruction, the secondary host begins to actively control the plurality of motors.

8. The control system according to claim 7, wherein after the first instruction is transmitted, if the primary host receives the first response corresponding to the first instruction, the primary host notifies the secondary host that the transmission link operates normally.

9. The control system according to claim 7, wherein the secondary host assists in controlling the plurality of clients when the transmission link fails.

* * * * *